H. J. HAY.
Derrick for Stacking Hay.

No. 163,193.  Patented May 11, 1875.

WITNESSES:
C. Neveux
A. F. Terry

INVENTOR:
H. J. Hay
BY
Munn
ATTORNEYS.

THE GRAPHIC CO. PHOTO-LITH. 39 & 41 PARK PLACE, N.Y.

UNITED STATES PATENT OFFICE.

HENRY JOHN HAY, OF OMPH GHENT, ILLINOIS.

IMPROVEMENT IN DERRICKS FOR STACKING HAY.

Specification forming part of Letters Patent No. 163,193, dated May 11, 1875; application filed April 10, 1875.

*To all whom it may concern:*

Figure 1:
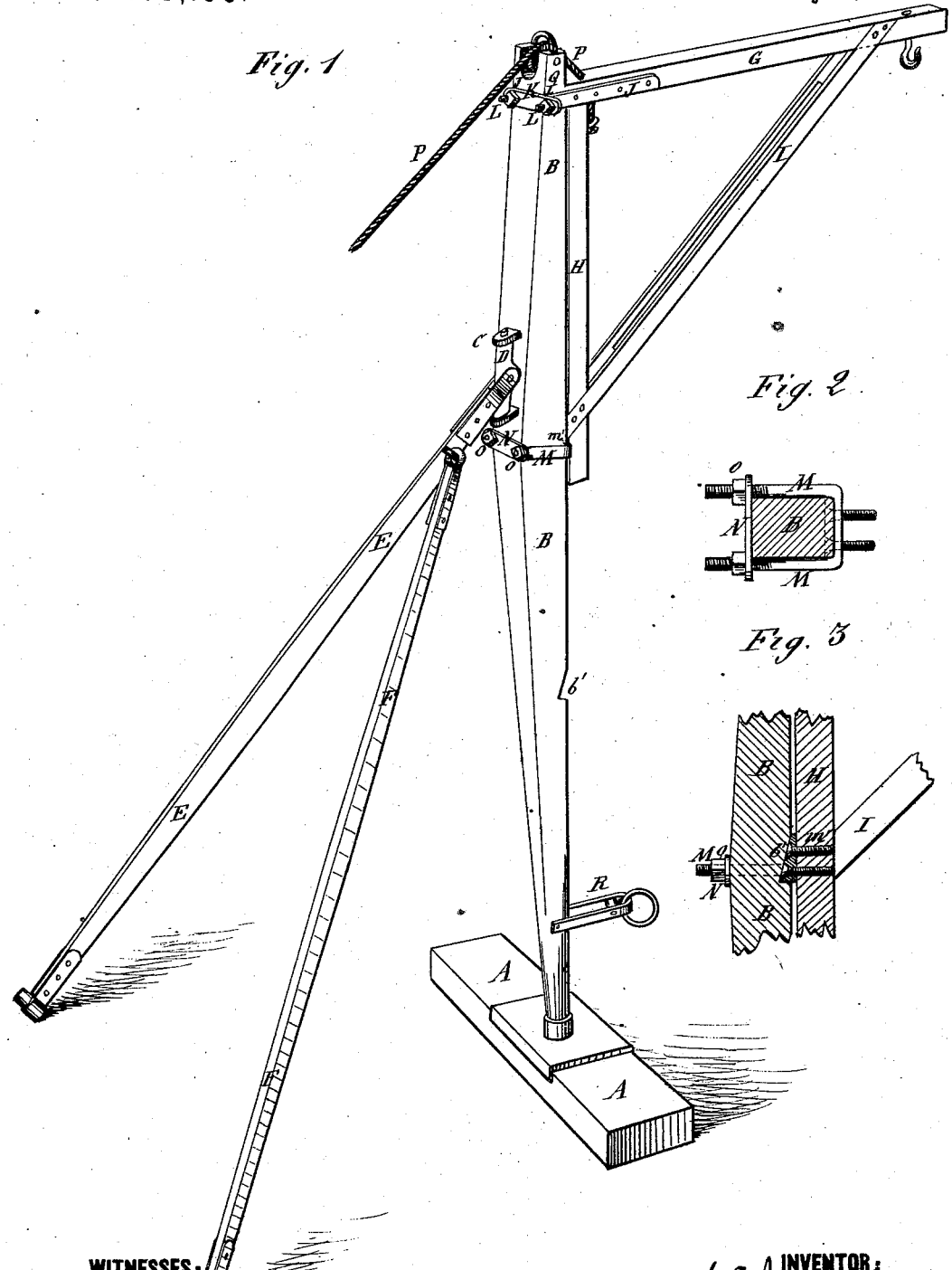
Figure 2:
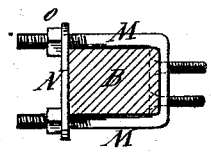
Figure 3:
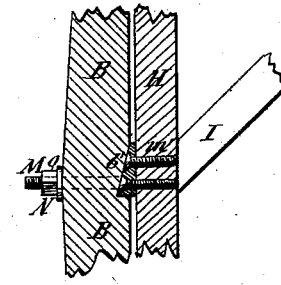

Be it known that I, HENRY J. HAY, of Omph Ghent, Madison county, Illinois, have invented a new and useful Improvement in Derrick for Stacking Hay, of which the following is a specification:

Figure 1 is a perspective view of my improved derrick. Fig. 2 is a detail cross-section of the upright shaft. Fig. 3 is a detail-section view of a portion of the upright shaft.

Similar letters of reference indicate corresponding parts.

The object of this invention is to furnish an improved derrick for stacking hay, which shall be simple in construction, convenient in use, and easily set up and taken down.

The invention consists of an improved hay-derrick formed of the foot-board, the pivoted upright shaft, the adjustable braces and their couplings, the adjustable arm and its couplings, the adjusting rope and pulley, and the rigid arm, combined with each other, as hereinafter fully described.

A is the foot-block, which is designed to be staked to the ground at the side of the place where the stack is to be built, and in which is formed a socket or step to receive the pivot formed upon or attached to the lower end of the upright shaft B. To the rear side of the upper part of the shaft B are attached two eyebolts, C, to and between which is pivoted a short shaft, D. To the short shaft D is pivoted the upper end of a brace, E, or straps attached to the upper end of said brace E. To the side of the brace E, near its upper end, is pivoted, by an eyebolt and clevis or other suitable coupling, the upper end of a second brace, F. To the lower ends of the braces E F are attached loops, to receive the stakes by which the said ends are secured to the ground. This construction allows the braces E F to be adjusted, as circumstances may require, to hold the shaft B vertical, and to resist the side draft of the hay while being raised and swung over the stack. G is the arm of the derrick, to the outer end of which is attached a hook-bolt, with nuts on the upper end, to receive the tackle for raising the hay, and the inner end of which is rigidly attached to the upper end of the bar H. The lower end of the bar H is connected with the outer part of the arm G by a brace, I. The three bars G H I thus form a firm and rigid arm. To the inner end of the bar G are attached straps J, which project upon the opposite sides of the shaft B, and have a yoke, N, placed upon them, and nuts O screwed upon their rear ends. To the inner side of the arm H is bolted the bend of a bow, M, the arms of which pass back upon the opposite sides of the shaft B, and have a yoke, N, placed upon them, and nuts O screwed upon their ends. The bend $m'$ of the bow M is made thick, wide, and wedge-shaped in its cross-section, or has a wedge-shaped block formed upon or attached to it, to enter a right-angled notch, $b'$, formed in the shaft B to receive it, and thus support the arm G H I and its load. Several notches $b'$ are formed in the shaft B, so that the arm G H I may be adjusted at any desired height. P is a rope, one end of which is attached to the bar H of the arm G H I. The rope P passes over a pulley, Q, pivoted to the upper end of the shaft B, and descends into such a position that it may be conveniently reached and operated to raise and lower the arm G H I, as required. To the forward side of the lower part of the shaft B is rigidly attached an arm, R, to receive the guide-pulley of the hoisting-rope, to swing the arm G H I over the stack when the load has been raised.

Having thus described my invention, I claim as new and desire to secure by Letters Patent—

An improved hay-derrick formed of the foot-board A, the pivoted shaft B, the braces E F and their couplings, the adjustable arm G H I and its couplings, the adjusting rope and pulley P Q, and the rigid arm R, constructed and combined with each other, substantially as herein shown and described.

HENRY JOHN HAY.

Witnesses:
ANTON HUBER,
CONRAD FARNER.